Nov. 29, 1966 — M. H. LILL — 3,288,020
APPARATUS FOR OPTICALLY MEASURING WHEEL
ALIGNMENT CHARACTERISTICS
Filed Jan. 8, 1963 — 8 Sheets-Sheet 1

INVENTOR
MELVIN H. LILL
BY
ATTORNEY

FIG_18

FIG_19

FIG_20

INVENTOR
MELVIN H. LILL

United States Patent Office 3,288,020
Patented Nov. 29, 1966

3,288,020
APPARATUS FOR OPTICALLY MEASURING WHEEL ALIGNMENT CHARACTERISTICS
Melvin H. Lill, Lansing, Mich., assignor to FMC Corporation, San Jose, Calif., a corporation of Delaware
Filed Jan. 8, 1963, Ser. No. 250,116
6 Claims. (Cl. 88—14)

The present invention pertains to apparatus for measuring the alignment characteristics of the wheels of a vehicle, and more particularly relates to improved optical wheel aligning apparatus having portable components, and to a method of obtaining wheel alignment measurements with the apparatus.

Present optical wheel aligning mechanisms are arranged to form stationary installations because they require more or less permanently fixed wheel support ramps, turntables, mirror units, projectors and charts. As a result, present wheel aligners are not only comparatively expensive, but need large installation spaces reserved for their exclusive use.

In contrast to the present fixed types of wheel aligning mechanisms, the wheel aligning apparatus of the present invention is comprised of portable components, none of which require permanent installation. Thus, one important feature of the invention is that the space which is usually required for wheel alignment equipment can also be used for other purposes because the apparatus is portable. The method of the present invention concerns the manner of aligning the light beams to obtain the wheel alignment characteristics, and the apparatus of the invention preserves the inherent accuracy of optical wheel alignment measurements but requires fewer and simpler components than present wheel aligners.

One object of the present invention is to provide an improved optical wheel alignment method, and apparatus for carrying out the method.

Another object of the invention is to provide optical wheel alignment apparatus which does not require permanent installation and is readily moved so that the floor space can be used for other purposes.

A further object of the invention is to provide an improved and simplified optical wheel aligning apparatus which is less costly to manufacture than present optical aligners.

Another object is to provide a novel light beam projector, chart and cooperating portable mirror unit wherein the light beams projected onto the mirror and reflected onto the chart can be visually adjusted into a precise and predetermined orientation solely by adjustment of the mirror.

Another object is to provide a portable mirror unit in which the mirror can be individually pivoted about three separate axes; two intersecting horizontal axes, and a vertical axis intersecting one of the horizontal axes.

These and other objects and advantages of the present invention will become apparent from the following description and from the accompanying drawings, wherein;

FIGURE 8 is a front elevation of the mirror stand assembly which is shown in FIGURE 2, said stand being illustrated adjacent a mirror mounted on the front left wheel of the vehicle.

The wheel alignment testing apparatus A (FIGURES 1 and 2) of the present invention includes a projection screen assembly B that is adapted to be positioned at a point spaced from the front end of the vehicle V. The screen includes two spaced chart panels C, each chart being associated with a light beam projector D, and the chart at one side of the vehicle is a reverse duplicate of the chart and projector at the other side of the vehicle, that is, the calibrations that are on the left side of a vertical centerline (FIG. 1) of one chart are on the right of the vertical centerline on the other chart.

Figure 1:
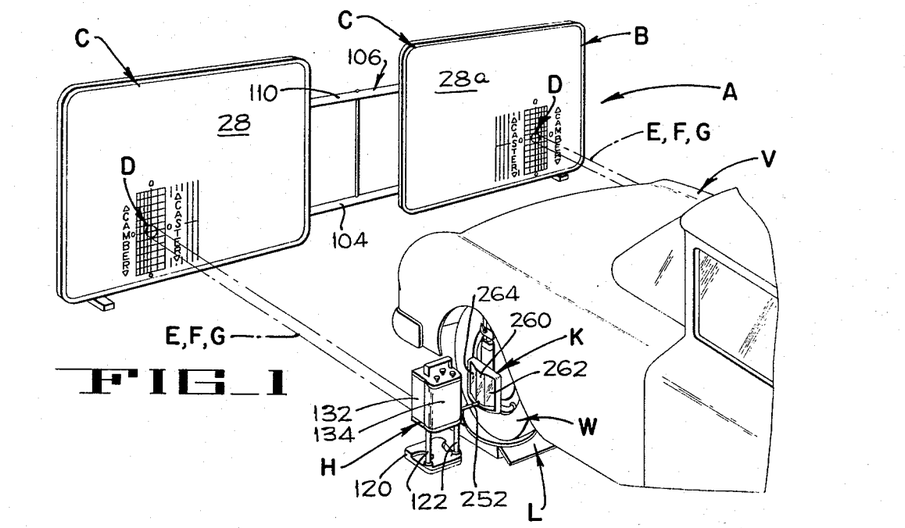
FIGURE 1 is a diagrammatic perspective of the two projection screens from which the alignment beams originate, and one of the two portable mirror stand assemblies associated with the front wheels of the vehicle during the wheel checking operation.
Figure 2:
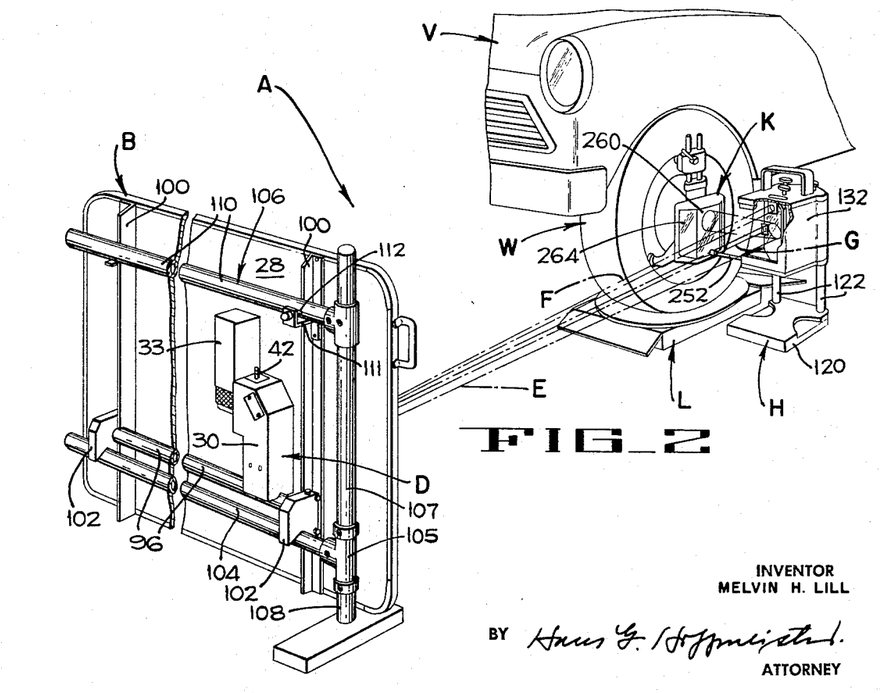
FIGURE 2 is a fragmentary perspective similar to FIGURE 1 but viewed in the opposite direction, i.e., from the rear of the projection screens looking toward the wheels of the automobile.

The light beams from the projectors D are substantially perpendicular to the faces of the charts C, are generally parallel to the longitudinal centerline of the vehicle, and are spaced outward from the sides of the vehicle. Each projector D originates three separate beams: a main beam E which carries a cross hair image, a reference beam F disposed in a vertical plane of main beam E and a reference beam G disposed in a horizontal plane of main beam E. The beams G of both projectors are inclined inwardly slightly relative to the vertical plane of the associated main beam E.

The three projected beams E, F and G are oriented in a particular manner so that a portable mirror stand assembly H adjacent each wheel W (only one wheel and mirror stand H being shown in FIGURES 1 and 2) can readily be positioned to accurately intercept the individual light beams and reflect each main beam E 90 degrees toward the adjacent wheel W, and reflect each reference beam F and G back to the chart C. Because the portable mirror stands H, as well as the projectors D and the two charts C comprising the projection screen B are reverse duplicates of each other, only the left side projector D, mirror stand H and the associated chart C will be described in detail. Where individual parts of the right side mirror stand, chart and projector appear in the drawings or specification, the same reference numerals with the suffix *a* are used.

A wheel mirror assembly K is mounted on each of the front wheels of the vehicle, this mirror being so arranged that the initial light beam E reflected from the portable mirror stand H toward the wheel mirror K is reflected back onto the mirror stand H, and thence to the associated chart C. The wheel alignment characteristics of each wheel are visually determined by the positions of the spots of light where the reflected main beam E impinges indicia on the charts.

The wheel mirror K is of conventional design and is fully disclosed in the Carr Patent 2,667,805. Similarly, two turntables L (only one being shown in FIGS. 1 and 2) which each support a front wheel W of the vehicle are old in the wheel aligning art and will, therefore, not be described in detail.

Figures 3, 4, 5, 6, 7:
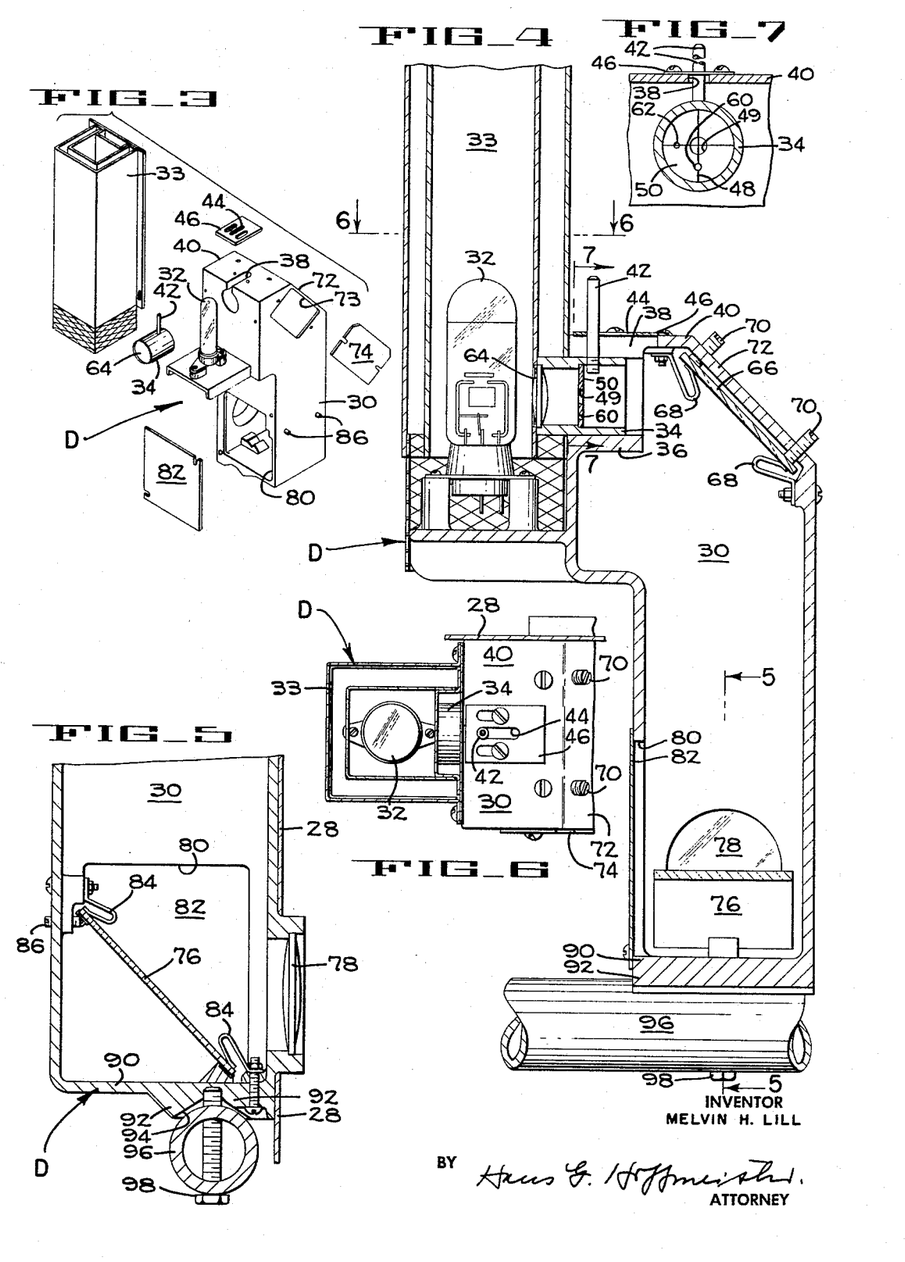
FIGURE 3 is an exploded perspective of the light beam projector shown in FIGURE 2, the view being taken from a position about ninety degrees to the left of the viewing position of the projector in FIGURE 2 to expose side faces of the projector that are not seen in FIG. 2.
FIGURE 4 is a fragmentary and substantially central vertical section through the light beam projector, the projector being oriented substantially the same as in FIGURE 2.
FIGURE 5 is a vertical section along the plane indicated by lines 5—5 on FIGURE 4
FIGURE 6 is a horizontal section along the plane indicated by lines 6—6 FIGURE 4.
FIGURE 7 is a fragmentary vertical section along the plane indicated by lines 7—7 on FIGURE 4.

The light beam projector D (FIGS. 2 and 3) of the present invention is mounted rigidly against the rear surface of a rigid metal panel 28 which forms the chart C of the projection screen assembly B. The projector includes a hollow housing 30, near the upper end of which a projection lamp 32 is mounted in a chimney 33 that is bolted to the housing 30. Adjacent the lamp 32, a lens barrel 34 is slidably mounted in a tubular boss 36 (FIG. 4), the bore of which communicates with a coextensive slot 38 in the top wall 40 of the housing. A focus-shifting rod 42 extends upward from the lens barrel, through the slot 38, and through a slot 44 in a limit plate 46. Plate 46 is adjustably bolted onto the housing 30 and limits the sliding movement of the focus shifting rod 42.

One setting of the lens barrel 34 will focus the image of the intersecting portion of a reticle, or cross hair, 48 (FIG. 7) upon the surface of the chart panel 28 (FIGS. 1 and 2) after the initial cross hair image has been reflected from the wheel mirror K onto the portable mirror stand H and back onto the chart panel 28. The cross hair 48 is formed by thin wires, or the like, which intersect at a point centered over a central aperture 49 in a masking disc 50 that is fixed in the lens barrel. The other setting of the lens barrel will cause the projected and then returned cross hair image to be sharp when it impinges the chart panel 28 after traveling to and from a mirror, not shown which is mounted on the rear wheel of the vehicle.

The masking disc 50 is provided with a first small aperture 60 that is vertically aligned with, and bisected by, the vertical portion of the cross hair 48. A second small aperture 62 is horizontally aligned with and bisected by the horizontal portion of the cross hair 48. The projected beams E, F and G (FIG. 2) thus emanate from the apertures 49, 62 and 60, respectively, and each carries a shadow image of the cross hair reticle 48. It will be apparent that, although the projected reference beams F and G diverge from the main beam E, they of course maintain their vertical and horizontal alignment with the cross hair image in all planes normal to the main beam E.

The light beams E, F and G which originate from the lamp 32 (FIG. 4) are transmitted through a condensing lens 64, through the apertured masking disc 50 and are reflected from a plane mirror 66. The mirror 66 is mounted at 45 degrees to the optical axis of the lens and reflects the beams downward through the hollow housing 30. The mirror 66 is adjustably held in place by spring clips 68 and by cooperating set screws 70 which extend through an adjacent wall 72 of the housing 30. An adjacent access aperture 73 (FIG. 3) and cover plate 74 in the housing 30 are provided for replacement of the mirror, if necessary.

The light beams reflected from the mirror 66 downward through the housing 30 strike a mirror 76 that directs the beams horizontally through a fixed projection lens 78. Lens 78 projects through the chart panel 28 (FIG. 5) and is aimed toward the vehicle V. An adjacent aperture 80 and cover plate 82 facilitate replacement of the mirror 76, and cooperating spring clips 84 and set screws 86 adjustably hold the mirror in place.

The bottom wall 90 (FIGS. 4 and 5) of the projector housing 30 is provided with downwardly projecting ribs 92 which form an inverted, substantially V-shaped notch 94 that receives the upper portion of a horizontal tube 96. The tube 96 is part of a mounting frame for adjustably securing the chart panel 28 to the projection screen assembly B. A capscrew 98 extends upward through the tube 96 and into a threaded portion of the projector wall 90 to lock the projector assembly D to the tube 96.

The tube 96 (FIG. 2) is part of a rectangular frame which includes two spaced vertical angle bars 100 that are bolted to the rear surface of the chart panel 28. A block 102 having a notched lower edge is connected to each vertical bar 100 and the tube 96. The notches lower edges of the blocks rest on a horizontal tube 104 of a main support frame 106 of the projection screen assembly B, said tube 104 supporting the chart panel 28 in a manner permitting lateral and tilting movements thereof. The end of the tube 104 is provided with a fitting 105 which is adjustably locked on a vertical tube 107 of a pedestal 108. A tube 110 that interconnects the upper portions of the pedestals is similarly connected to the tube 107.

Tilting adjustment of the chart panel 28 is provided by an angle bracket 111 which projects rearwardly from the outermost angle bar 100 (FIG. 2) and is provided with a threaded bolt 112 that contacts the tube 110 since the chart panel 28 is overbalanced toward the vehicle V. The blocks 102 which rest on tube 104 thus provide pivot means for tilting the chart, whereby turning the bolt 112 will tilt the angle bars 100 and the chart panel 28. Consequently, the light beams E, F and G will be raised or lowered since the projector D is also part of the same rigid, tiltable assembly. The chart panel 28 can be readily shifted endwise along the support frame 106 so that the projected light beams E, F and G are spaced the proper distance from the side of the vehicle.

Figure 9:
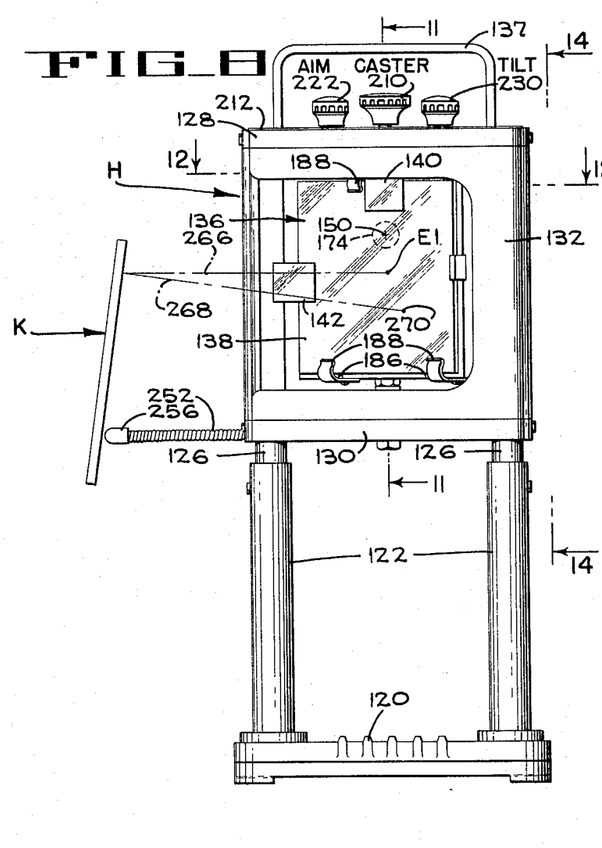
FIGURE 9 is an exploded perspective illustrating the portable mirror stand assembly shown in FIGURE 8.
Figure 10:
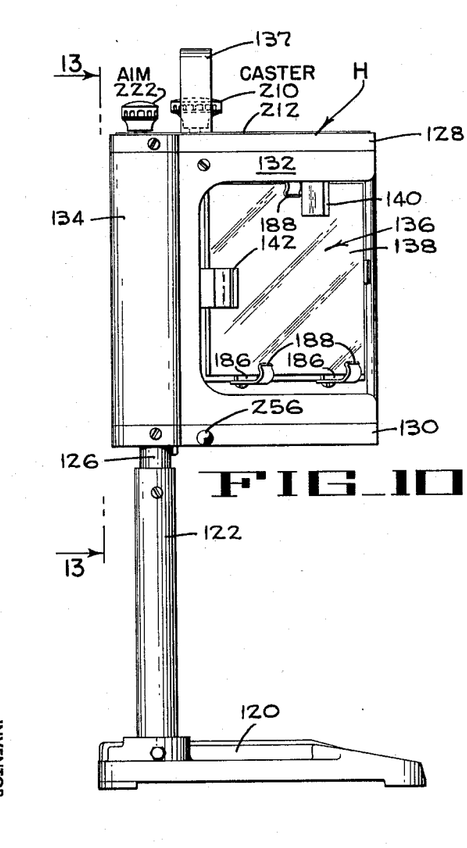
FIGURE 10 is a side elevation of the mirror stand assembly shown in FIGURE 8.
Figure 11:
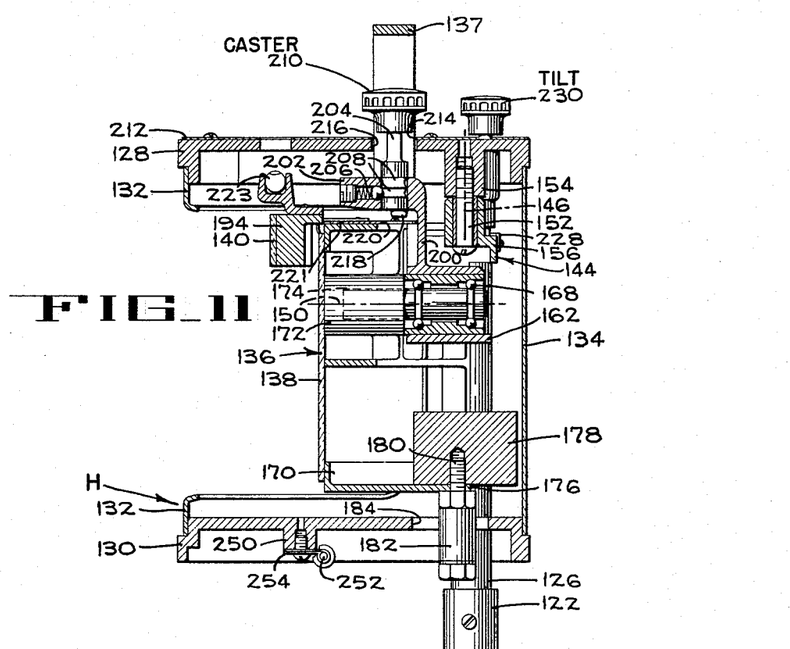
FIGURE 11 is an enlarged vertical section taken along lines 11—11 on FIGURE 8.
Figure 12:
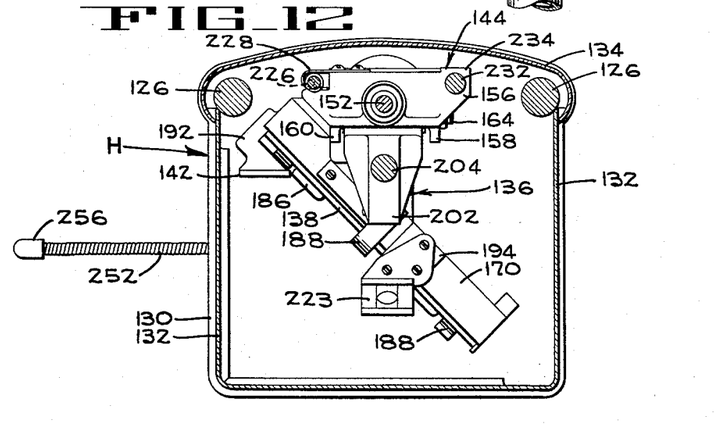
FIGURE 12 is an enlarged horizontal section taken along lines 12—12 on FIGURE 8.
Figure 13:
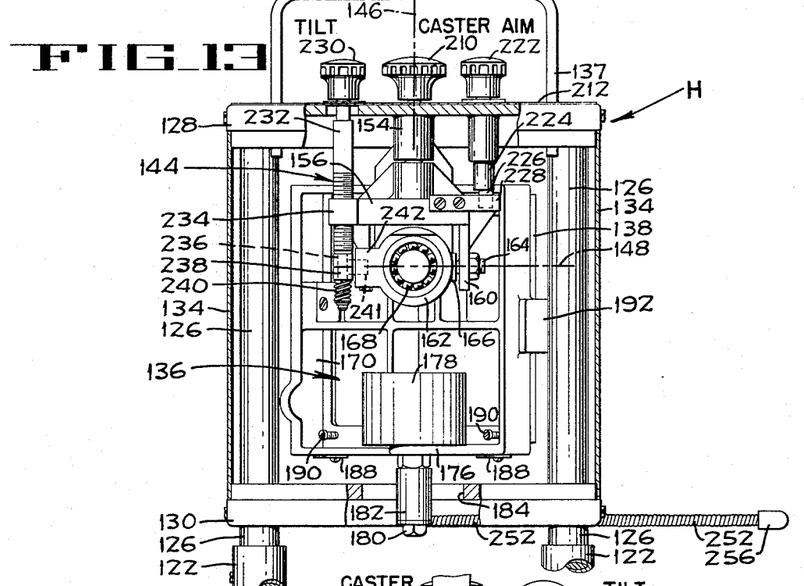
FIGURE 13 is an elevation, partly broken away, taken looking at the rear face of the mirror stand in the direction of the arrows 13—13 on FIGURE 10.

The portable left side mirror stand H (FIGS. 8 and 10) includes a base plate 120 which is provided with two spaced upstanding tubular posts 122. A shaft 126 is adjustably locked within each post 122. Two vertically spaced horizontal frame plates, an upper plate 128 and a lower plate 130 (FIG. 9) interconnect the two shafts 126 and, in conjunction with an apertured sheet metal housing 132 and a curved rear plate 134, serve to enclose the mechanism which is used for adjusting a movable mirror unit 136. The mirror unit 136 is adapted to intercept and reflect the projected light beams E, F and G. A handle 137 is secured to the upper frame plate 128 for carrying the portable mirror stand H.

The mirror unit 136 comprises a large plane mirror 138 which is adapted to receive the main light beam E, a small plane mirror 140 which is adapted to receive the reference light beam F, and a small plane mirror 142 which is adapted to receive the reference light beam G. The purpose of the mirrors 140 and 142 are to reflect their associated reference light beams F and G, respectively, back to the chart panel 28 of the projection screen assembly B, while the purpose of the mirror 138 is to reflect the main light beam E precisely 90 degrees toward the mirror unit K on the wheel of the vehicle, and to return the main beam reflected from the wheel mirror K back to the chart panel 28. The small mirrors 140 and 142 (FIGS. 8 and 9) have their reflecting surfaces lying in parallel vertical planes which are disposed at 45 degrees to the reflecting surface of the mirror 138, as measured in a horizontal plane.

The mirror stand H is a completely portable unit and is designed to be used on any substantially level floor, no permanent reference points on the floor being required for locating the mirror stand. Thus, when the mirror stand is first set up for use adjacent the vehicle wheel W, the mirror unit 136 is unlikely to reflect the main light beam E directly back to the chart so that it will fall on the vertical zero line through the projector. In order to achieve alignment of the light beams as is required for aligning operations, the mirror unit 136 is movable by a mirror adjustment mechanism 144 (FIGS. 11-14) which can be manually actuated to effect simultaneous movement of the beams reflected from the mirrors 138, 140 and 142, which reflected beams correspond to the light beams E, F and G.

By means of the adjustment mechanism 144, the mirror unit 136 can be swung sidewise about a vertical axis 146 near the rear of the stand (FIG. 12), tilted up or down about a horizontal axis 148 near the rear of the stand, and can be rotated about a second, normally horizontal axis 150 (FIG. 11) that is normal to axis 148 and intersects the mirror 138 at 45 degrees measured in a horizontal plane. All of these movements can be effected individually, or simultaneously, and their functions will later be explained in detail. Axis 146 is defined by a pivot stud 152 (FIG. 11) which has an upper threaded end portion screwed into a boss 154 which depends from the frame plate 128. A depending yoke 156 (FIG. 9) is pivotally mounted on stud 152 and is provided with two transversely spaced legs 158 and 160, respectively, and the pivot axis 148 is defined by two aligned cone-head set screws 164 in the legs 158 and 160. Yoke 156 carries a hub 162 which defines the horizontal axis 150, said hub being pivoted to the lower end portions of the legs 158 and 160 by means of the cone-head set screws 164. The screws 164 project inward through the legs and are seated in mating hardened inserts 166 which are pressed into apertures in the hub. The hub 162 is provided with an internal ball bearing unit 168 that provides antifriction means to facilitate the free rotation of the mirror unit 136 about the horizontal axis 150.

The mirror unit 136 includes a mirror support bracket 170 (FIG. 9) that has an integral boss 172. A pivot shaft 174 projects from the ball bearing 168 and is locked in the boss 172. It will be seen that the axis 150 (FIG. 8), of the pivot shaft 174 is above the center of the mirror support bracket 170 so that the bracket depends from the pivot shaft. A shelf 176 (FIG. 11) projects rearwardly from the lower end of the mirror bracket 170 and supports a weight 178 whereby the mirror unit 136 is biased to normally hang from the pivot shaft in a position in which the mirrors 138, 140 and 142 (FIG. 8) are in vertical planes. Also, the centers of the reflecting surfaces of the small mirrors 140 and 142 are respectively vertically and horizontally aligned with the center of the large main beam mirror 138, or in other words are aligned with the projected image of the cross hair 48 (FIG. 7) in the main beam E.

In order to facilitate the factory adjustment of the mirror unit 136 so that the mirrors 138, 140 and 142 are normally vertical, the weight 178 (FIGS. 11 and 13) is eccentrically mounted on the shelf 176 by a capscrew 180. Rotation of the mirror unit 136 about the horizontal axis 150 is limited by a rubber bumper 182 that is mounted on the lower portion of the bolt 180 and projects through an aperture 184 in the frame plate 130.

The front face of the mirror support bracket 170 (FIGS. 8-10) is provided with two ledges 186 that support the mirror 138, and a plurality of spring clips 188 are bolted to the bracket and resiliently secure the mirror in place. Adjustment of the mirror 138 relative to the mirror support bracket 170 (FIGS. 13 and 14) is made by means of three set screws 190 which project through the upper and lower portions of the support bracket and abut the back of the mirror 138. Adjustment of the mirror 138 so that it is vertical when the pivot shaft 174 is horizontal is only carried out during assembly of the mirror stand H and during periodic checks after the mirror stand has been in use for some time.

The mirror support bracket 170 (FIG. 9) is provided with an integral pad 192 on which the small side mirror 142 is cemented so that small mirror 142 is at 45 degrees relative to the mirror support bracket 170 and is oriented in a vertical plane when the pivot shaft 174 is horizontal.

The small upper mirror 140 is also disposed at 45 degrees relative to the main mirror support bracket 170, being cemented to a pad 194 that is integrally formed on the upper edge of the mirror support bracket 170, said mirror 140 being in a vertical position when the pivot shaft 174 is in its normal horizontal position.

Projecting upwardly from the hub 162 (FIG. 9) is a lever 200 that is integral with the hub and has a forwardly projecting upper arm portion 202 which lies close to the upper frame plate 128. A vertical bore in the arm 202 is provided for the slidable mounting of a control shaft 204, one function of which is to rotate the mirror unit 136 and the mirror support bracket 170 about the horizontal axis 150 in obtaining the caster measurements of the vehicle wheels.

The control shaft 204 is retained in each of two vertically adjusted positions in arm 202 by the ball of a detent latch 206 which resiliently engages either of two adjacent annular grooves 208 that are formed on the control shaft 204. The upper end of the shaft 204 is provided with a caster knob 210 that is located above a suitably marked instruction plate 212 that is bolted on the frame plate 128. The upper portion of the control shaft 204 passes through a large clearance aperture 214 in the plate 212 and through an aperture 216 in the plate 128 so that, in any normal adjusted rotative position of the hub 162, the control shaft does not contact either the frame plate 128 or the plate 212.

When the ball of the detent latch 206 is engaged with the uppermost groove 208 (by rotating and pushing downward the knob 210) an eccentrically mounted pin portion 218 on the lower end of the control shaft 204 is adapted to seat within a slot 220 (FIG. 9) in a plate 221 that is bolted to the top surface of the mirror support frame 170. The slot 220 is elongate in the direction of the horizontal axis 150, is aligned vertically with axis 150, and is only wide enough to receive the eccentric pin 218. Consequently, when the pin and side walls of the slot are interengaged, rotation of the caster knob 210 causes the mirror support bracket 170 to shift relative to the lever 200 of the hub 162 and thus pivot about the axis 150. The previously mentioned normal vertical and horizontal alignment of the reference beam mirrors 140 and 142 (FIG. 8) relative to the projected cross-hair is therefore altered because the mirror unit 136 is rotated with the mirror support bracket 170. When the normal position of the mirror unit 136 is thus disturbed, the main beam E reflected from the wheel mirror K back to the mirror 138 will not impinge thereon at the same point as when the mirror 138 is in its normal vertical position. The spot caused by the main light beam E reflected back onto the chart 28 is thus displaced up or down along an arcuate path on the face of the chart. If the caster knob 210 is pulled upward to disengage the eccentric pin 218 from the slot 220, the weight 178 will cause the mirror unit 136 to rapidly swing upright, whereby the reference beam mirrors 140 and 142 resume their previous vertical orientation. In order to enable the operator to determine that the mirror unit has returned to its upright position, a level vial 223 (FIGS. 11 and 12) is secured to the upper edge of the mirror support bracket 170.

Sidewise movement of the mirror unit 136 (FIG. 10) together with the yoke 156, the hub 162 and the mirror support bracket 170 about the vertical axis 146 is accomplished by rotating an Aim knob 222. The Aim knob is secured to a control shaft 224 (FIG. 13) which is rotatably mounted in the upper frame plate 128 and has an eccentric lower end pin portion 226 (FIG. 12) that is disposed within the hooked end of a spring steel clip 228. The clip 228 is secured by screws to the rear upper edge portion of the yoke 156 laterally from the pivot stud 152. Turning the Aim knob 222 will thus rotate the yoke and will swing the mirror unit 136 about axis 146. Attention is directed to the fact that such sidewise movement of the mirror unit does not impede rotation of the mirror unit about the axis 150 by the Caster knob 210, and that movement effected by the Aim knob will swing the spots of light caused by the beams reflected back onto the chart 28 along horizontal paths.

Figure 14:
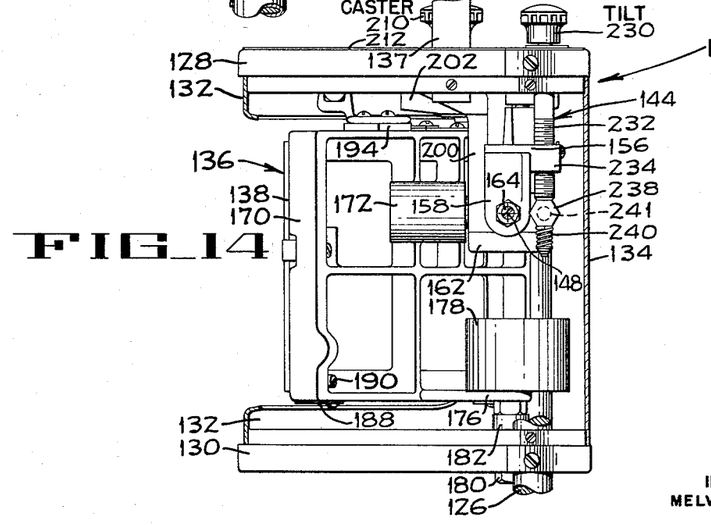
FIGURE 14 is an elevation, partly broken away, taken looking in the direction of arrows 14—14 on FIGURE 8.

The up and down tilting of the mirror unit 136 (FIGS. 12 and 13) about the horizontal axis 148 is effected by rotating a Tilt knob 230. The Tilt knob is secured to a threaded control shaft 232 which projects through a large aperture in the frame plate 128 and through a threaded hole in a lug 234 that projects transversely from the yoke 156. A reduced diameter unthreaded lower end portion 236 of the control shaft 232 extends through a hexagonal block 238 (FIG. 14) and a compression spring 240 is retained on the shaft 236 under the block 238 so as to provide a yieldable connection of the control shaft to the block. A pivot pin 241 (FIG. 13) projects laterally from the block 238 and is freely rotatable in a socket in a lug 242 of the hub 162. The axis of the pivot pin 241, as shown in FIGURE 14, is spaced rearward from the axis 148 of the pivotal connection of yoke 156 to the hub 162. Rotating the Tilt knob 230 and its control shaft 232 thus raises or lowers the control shaft relative to the internally threaded lugs 234 and pivots the hub 162 about the horizontal pivot axis 148. As a result of such pivotal movement, the mirror unit 136 is tilted toward or away from a truly vertical position and the spots of light reflected therefrom back to the chart 28 of the projection screen assembly B are, accordingly, vertically moved on the face of the chart 28.

A mounting boss 250 (FIG. 11) depends from the bottom frame plate 130 and one end of a gauge finger 252 is bolted to the boss by means of a clamp 254. The gauge finger 252, which normally extends in a straight line outwardly from the plate 130, is formed of a closely spaced coil of spring steel which can be coiled and nested within the hollow underside of the frame plate 130 when it is not in use. In use, the gauge finger projects laterally toward the wheel of the vehicle, and the mirror assembly H is positioned so that the outer end 256 of the gauge finger nearly touches the wheel mirror unit K (FIGS. 1 and 8) as one of the first steps in setting up the mirror assembly in a wheel alignment checking operation.

At the beginning of a wheel checking operation using the apparatus of the present invention, the vehicle V (FIGS. 1 and 2) is driven onto the turntables L to a position that is as close to a straight ahead position as is possible, or in other words, to a position such that the longitudinal centerline of the vehicle is almost perpendicular to the faces of the chart panels 28 and 28a. One of the wheel mirror units K is then clamped onto each front wheel W. The wheel mirror unit K, as is disclosed in the aforementioned Carr patent, comprises a central mirror 260 which had a planar reflecting surface parallel to the general plane of the wheel W, and is provided with wing mirrors 262 and 264 which, in the present case, are each disposed 15 degrees from the plane of the central mirror 260. The mirrors 260, 262 and 264 are part of a rigid unit which includes a pivot shaft (not shown) that projects laterally from the clamping means engaging the wheel W. The pivot shaft is parallel to the axle of the wheel and the mirrors are so balanced on the pivot shaft that they remain upright at all times.

A portable mirror stand H is then placed beside each front wheel W with the tip of the associated gauging finger 252 nearly touching the face of the mirror 260, and with the side edges of the mirror stand disposed substantially perpendicular to the faces of the charts C of the projection screen B. The gauging finger 252 is then coiled and nested out of the way under the bottom frame plate 130.

It will be understood that when the projection screen assembly B (FIGURES 1 and 2) was initially adjusted at its installation site, the charts 28 and 28a were vertically positioned so that the projector beams will be substantially horizontal, whereby the charts are accordingly close to vertical. Also, the height of each mirror assembly H was vertically adjusted so that the intersection of the cross hair image in the main beam E strikes the mirror unit 136 (FIG. 8) approximately at a level which includes the point shown at E1, which is at about the level of the vertical centers of the mirrors 142 and 138.

For the present description, it will be assumed that the central wheel mirror 260 of the wheel mirror unit K is truly parallel to the general plane of the wheel, that is, that there is no "run out" error to correct. If there is any run out, the correction procedure can be carried out, prior to obtaining the wheel alignment measurements, in the manner disclosed in the previously identified Carr patent.

The projector D (FIGURE 2) is turned on and the chart panel 28 is slid endwise along the tubes 104 and 110 until the main beam E is centered laterally on the mirror 138, whereby the projected image of the cross hair centers on point E1 (FIG. 8). If necessary, the bolt 112 (FIG. 2) is turned to tilt the chart panel 28 and its projector D, so that the beams E, F and G are raised until the main beam E is exactly centered on the point E1 on mirror 138. The Caster knob 210 (FIG. 11) is pulled upward and the mirror unit 136 will then swing upright due to counterweight 178, and the mirrors 138, 140 and 142 will thus be vertical.

When the projector D and the mirror assembly H are aligned as described, the reference beams F and G are reflected by their respective mirrors 140 and 142 back to the chart panel 28. Due to the divergence of the projected and then reflected beams, the space between the spots of light on the chart panel is rather large and the accuracy of the subsequent beam alignment procedure is thereby enhanced. Since the masking disc 50 (FIGURES 4 and 7) causes the reference beams F and G to be projected in vertical and horizontal alignment with the image of the cross hair 48, the spots of light reflected back onto the chart panel 28 will retain the same alignment because the mirrors 138, 140 and 142 are vertical.

The main beam E strikes the mirror 138, is reflected to the central wheel mirror 260 which in turn reflects the beam back to the mirror 138, and mirror 138 returns the beam to the chart panel 28. The face of the chart panel 28 is provided with the wheel measurement markings shown in FIGURE 20, and the chart panel 28a is provided with a similar, but oppositely oriented chart. Each chart has a vertical zero line intersecting a horizontal zero line at the optical axis of the projection lens 78, only the vertical and horizontal zero lines of the wheel measurement markings being shown in FIGURES 15–19.

Each chart panel 28 is also provided with a rear wheel tracking chart which is not illustrated herein because the steps in checking the rear wheel tracking are old in the art. However, the previously mentioned mechanism for changing the focus of the projector D by shifting the lever 42 (FIGURE 4), so that the image of the projected cross hair 48 is sharp when it returns to the chart panel 28 after being reflected from a rear wheel mirror, is a feature of the present invention.

Returning to the operations involved in setting up the mirror stand H, the three spots of light impinging the chart panel are shifted on the chart by adjusting only the Aim knob 222 and the Tilt knob 230. (The Caster knob 210 is at this time in its uppermost position shown in FIGURE 11 so that the mirror unit 136 hangs freely from the pivot shaft 172.) The Aim knob is rotated to swing the mirror unit 136 (FIGURES 11 and 12) sidewise about the vertical axis 146 until a spot F1 (FIGURE 15) corresponding to the reference beam F is reflected by the mirror 140 onto the chart and is centered on the vertical zero line. The Tilt knob is then rotated to tilt the mirror unit 136 (FIGURES 11 and 12) about the horizontal axis 148 until a spot G1 (FIGURE 15) corresponding to the reference beam G, is reflected from the mirror 142 onto the chart and is centered on the horizontal zero line.

When the spots F1 and G1 (FIG. 15) thus coincide with the zero lines, the reflecting surfaces of the small mirrors 140 and 142 which have been adjusted by moving the mirror unit 136 to cause this coincidence, are very close to perpendicular to their respective light beams. Consequently, since the large mirror 138 is displaced 45 degrees from the mirrors 140 and 142, the large mirror is 45 degrees (measured in a horizontal plane) from the general plane of the adjacent vehicle wheel W. If the left wheel W is in a straight ahead position, the main beam spot at E2 on the chart will be precisely centered on the vertical zero line and the apparatus is in a position for measuring Camber of the left wheel W. Due to camber of the left wheel W, and the consequent inclination or camber of the mirror 260, the cross hair image E2 will be located below the horizontal zero line and among a series of horizontal lines (FIG. 20) which are labeled camber. Above the horizontal zero line, the camber lines relate to negative camber, and below the zero line the camber lines indicate positive camber. Thus, if the spot E2 (FIG. 15) is on the eighth line below the horizontal zero line on FIGURE 20, 1 degree of positive camber is indicated for the front left wheel W.

The next alignment operations concern Caster, or fore and aft tilt of the kingpin of the wheel W, and Toe-Out-On-Turns, or the number of degrees one wheel is turned from a straight ahead position when the other wheel is placed in a 15 degree turning position. With the chart illustrated in FIGURE 20 and with the particular wheel mirror unit K having 15 degrees wing mirrors, the Toe-Out-On-Turns measurement is initiated by turning one wheel W (FIG. 16), for instance, the left wheel, until the main beam E is reflected by mirror 138 of mirror stand H onto the front wing mirror 264 of wheel mirror unit K. When the reflected cross hair image E2 of the main beam E coincides with the vertical zero line on the chart, the left wheel has been turned exactly 15 degrees.

The Caster control knob 210 (FIGURES 11 and 12) is then pushed down and is rotated to engage its eccentric lower end pin 218 in the slot 220 of plate 221. After engaging the eccentric pin in the slot and further rotating the knob 210, the mirror unit 136 (FIGURE 8) pivots about the horizontal axis 150 and the mirror 138 consequently, tilts sidewise and out of its former vertical position. The cross hair image of the light beam E (FIG. 17), accordingly, no longer strikes the mirror 138 at its initial point of contact at E1 (FIG. 8) and the cross hair image E2 (FIG. 16) reflected back to the chart from the mirror follows an upward arcuate path across the chart when the knob 210 is moved in the appropriate direction. When the cross hair image E2 reaches the horizontal zero line at E3 (FIG. 17) the knob 210 is released.

Figures 15, 16, 17:
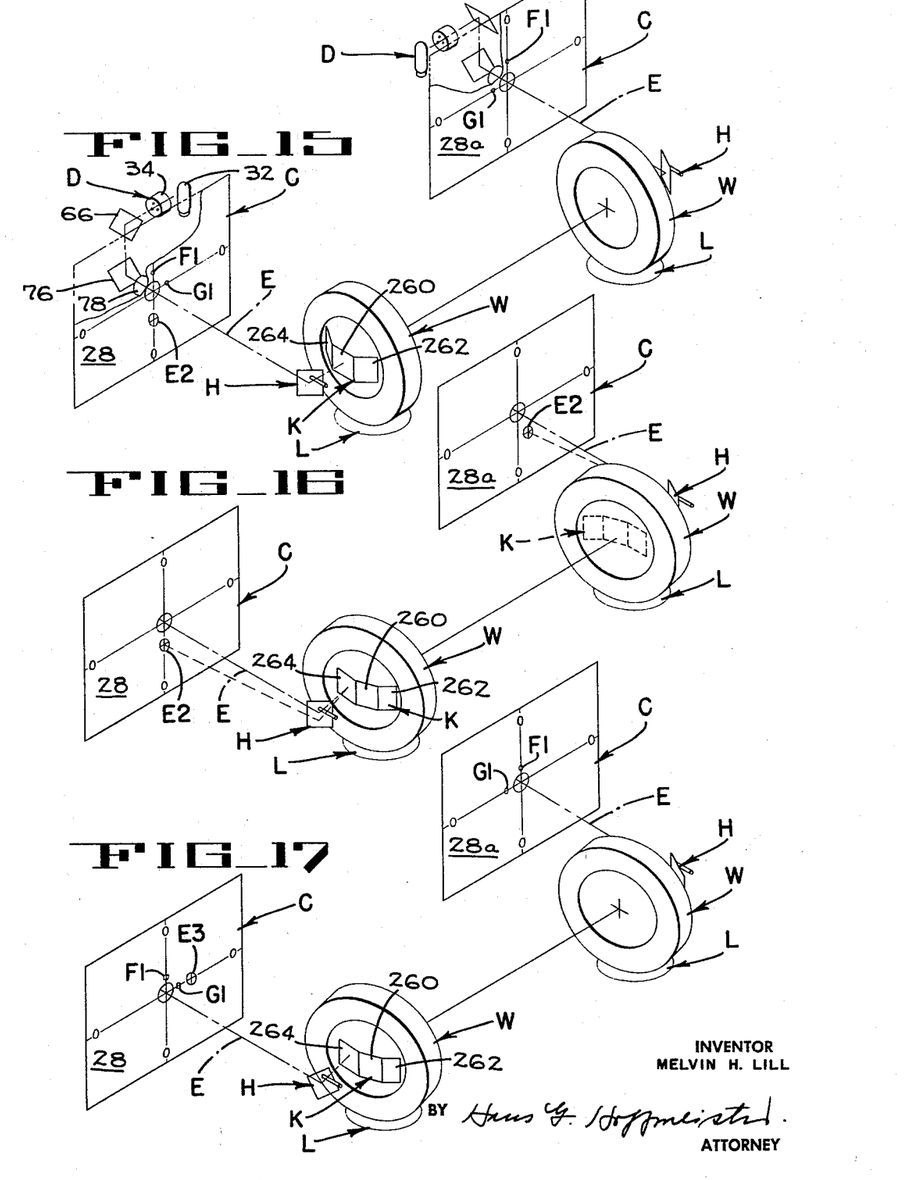
FIGURES 15-19, inclusive, are schematic fragmentary perspectives illustrating successive operations in a typical wheel alignment procedure.

To further explain the foregoing operations: The initial main beam E strikes the mirror 138 (FIG. 8) with the intersection of its cross hair image on the reference point E1. The beam is deflected laterally by the mirror 138 along a line 266, strikes the reflecting surface 260 of the wheel mirror unit K and is returned to mirror 138 at point 270 along some other path such as path 268. When the wheel is turned 15 degrees, as shown in FIGURE 16, the wheel W, and consequently mirror K, changes camber angle due to the kingpin inclination, or caster. This camber angle change, which thus reflects the inter-related effects of both caster and camber, causes the beam 268 to shift vertically and horizontally relative to beam 266 when the beam is reflected from the front wing mirror 264 (FIG. 17).

If the mirror unit 136 (FIG. 8) is rotated about the axis 150, the initial beam impact point E1 on the mirror is changed, and the impact point 270 is also changed, not only with respect to the mirror, but also with respect to the point E1. In other words, the distance between points E1 and 270 will change and the cross hair image returned to the chart panel from the point 270 will move up or down on the chart (according to the direction the mirror unit is rotated) in an arcuate path.

Figures 18, 19, 20:
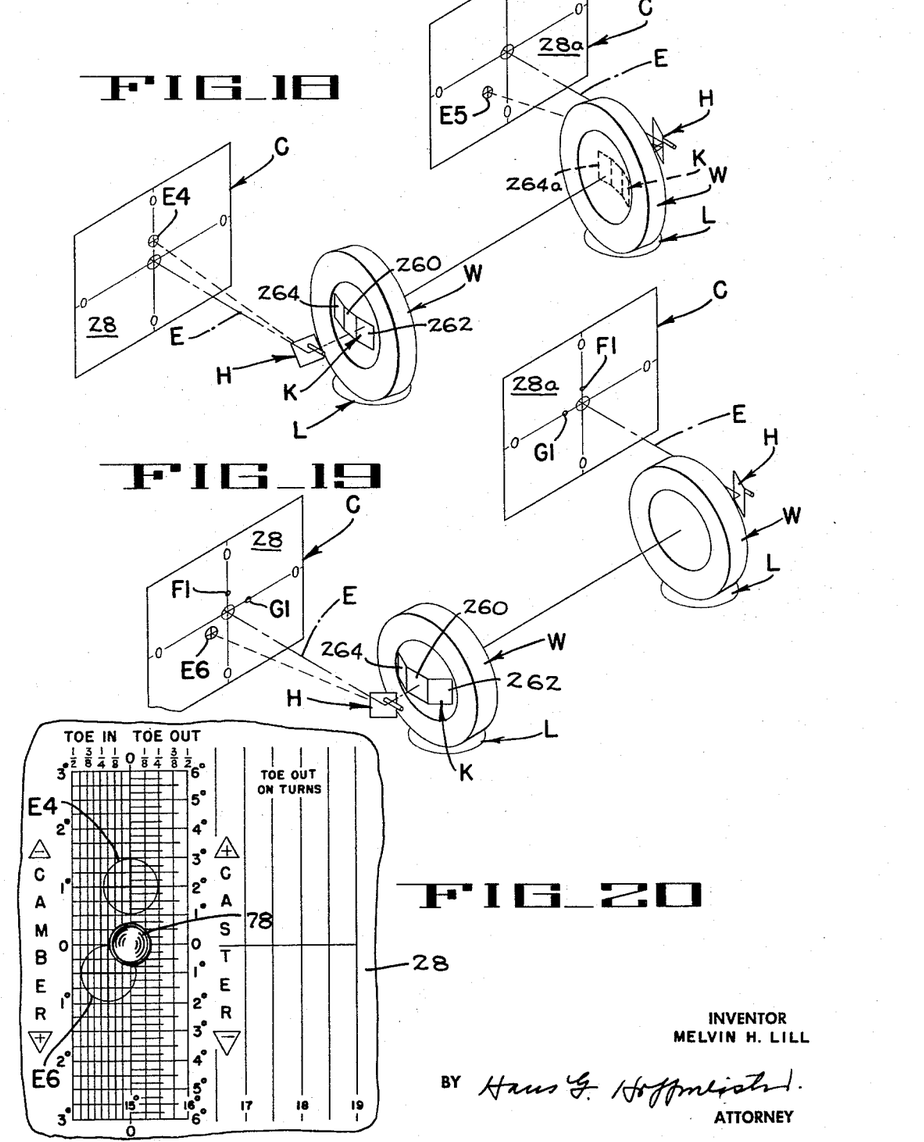
FIGURE 20 is an elevation of the chart indicia on the left panel of the projection screen for determining the front wheel alignment characteristics.

When the cross hair image E2 (FIGURE 16) is moved on the chart panel 28 (by rotating the mirror unit 136) to the position E3 (FIG. 17) on the horizontal zero line, the left front wheel W is then turned to the right (FIGURE 18) until the main beam E strikes the rear wing mirror 262 and is reflected onto the vertical zero line of the chart panel 28 at a point such as E4. The main beam E for the right wheel W is thus reflected from its front wing mirror 264a and is reflected back onto its chart panel 28a at a point E5 which is below the horizontal zero line and to the left of the vertical zero line. This area of chart 28a is marked with vertical lines at ½ degree intervals in the same manner as the corresponding portion of the chart 28 (FIG. 20). These vertical lines relate to and are labeled as Toe-Out-On-Turns. The spot E5 thus indicates perhaps 18 degrees toe-out-on-turns for the right wheel W when the left wheel W is turned 15 degrees toward the right.

The cross hair image at E4 (FIG. 18) on chart 28 is compared against horizontal reference lines labeled Caster, as shown in FIGURE 20, which lines above the zero line indicate positive caster and below the zero line indicate negative caster for the steering axis of the left wheel W. Thus, if the image E4 of FIGURE 18 lies on the chart at the corresponding point E4 in FIGURE 20, the left wheel W has 2 degrees positive caster. The caster of the steering axis of the right wheel, and the toe-out-on-turns of the left wheel are measured at the completion of a similar procedure to the one outlined, but beginning with the right wheel W.

The wheels are then returned to their straight ahead positions (FIG. 19), and the Caster knob 210 (FIGURE 11) is pulled up so that the mirror unit 136 is free to swing back to its normal vertical position and the previously obtained camber measurement can be checked to determine that any corrections which may have been made in the wheel suspension have effected camber measurement in the desired manner. The spot G1 (FIG. 19) of the reflected reference beam G will thus return to its FIGURE 15 position on the horizontal zero line, and the cross hair image will lie, if the wheel W has toe-in plus positive camber, at a point E6 below and to the left of the intersection of the zero lines on the chart panel, and among a series of vertical lines shown in FIGURE 20 and labeled Toe-In. Thus, if the cross hair image E6 of FIGURE 19 impinges the chart at the point E6 on FIGURE 20, the left wheel W now has ½ degree positive camber, in contrast to the 1 degree camber it formerly had before correcting adjustments were made in the wheel suspension.

To the left and right of the vertical zero line (FIG. 20), the toe-in lines respectively indicate combined toe-in and toe-out of the two wheels W. Thus, when the reference spots F1 and G1 (FIG. 19) of the right wheel measuring apparatus are on their corresponding zero lines, the front portions of the two wheels W are then spread apart to remove any backlash in their suspension systems, and the total toe-in or toe-out is read from the markings where the cross hair image E6 lies on the chart in FIGURE 20. In this case the markings indicate a total toe-in measurement of 3/16 of an inch, or 3/32 of an inch toe-in for each wheel.

When the rear wheels, not shown, of the vehicle are checked, a rear wheel mirror as disclosed in the Carrigan Patent 2,765,701 is mounted on each rear wheel of the vehicle. While the method of carrying out the rear wheel alignment checking operations for the apparatus of the present invention is old, it should be noted that the projectors D provide an adjustable focus feature which facilitates the rear wheel alignment check. The front wheel mirror stands H are first removed, and the focus shift lever 42 (FIGURE 4) is then moved to the end (nearest the vehicle) of the slot 44 so that the lens barrel 34 is at its most distant position from the projection lamp 32. This procedure changes the effective focal length of the lens system so that the cross hair image is sharp when reflected from the rear wheel mirrors back onto rear wheel measurement marks (not shown) on the chart panels 28 and 28a. The lens systems of the projectors D provide a depth of field sufficient to effect a sharp cross hair image on the chart panels C throughout the usual range of different wheelbase measurements of cars and light trucks.

An important feature of the invention is the provision of the projectors D for the three-part beams and the portable mirror stands H for reflecting the three beams so that none of the wheel alignment apparatus requires permanent mounting in the area allotted for its use. The apparatus can therefore be removed between wheel alignment operations and the area can be used for other purposes. Another important feature resides in the fact that the present invention provides the inherent accuracy of optical aligning systems with apparatus that is less expensive than present optical wheel aligners because this apparatus eliminates the necessity of rigid, accurately machined and permanent structures.

While a particular embodiment of the present invention has been shown and described, it will be understood that the particular details herein set forth are capable of modification and variation without departing from the principles of the invention and that the invention is limited only by the scope and proper interpretation of the appended claims.

The invention having thus been described, that which is believed to be new and for which protection by Letters Patent is desired is:

1. In an optical wheel aligning apparatus the combination comprising a projector for emanating three separate beams including a horizontal main beam and two reference beams respectively spaced from the main beam in a horizontal plane and in a vertical plane both intersecting the main beam; a mirror stand including a movable mirror support bracket; a first plane mirror mounted on said bracket and capable of being located by movement of the bracket to reflect the projected main beam along a horizontal path perpendicular to the projected beam; and second and third plane mirrors carried by said bracket in predetermined orientation relative to said first mirror, each of said second and third mirrors being so positioned as to intercept a different one of said reference beams and reflect the beam toward said projector in substantially the same horizontal and vertical orientation relative to the main beam as the initially projected orientation of the beams, when said main beam is reflected along said perpendicular path, whereby said mirror stand can be installed adjacent the vehicle wheel for an alignment measuring operation without the use of predetermined reference points for the mirror stand.

2. In an optical wheel aligning apparatus the combination comprising a projector having a lamp housing; a lamp in said housing; optical means for projecting a beam from said lamp through said housing; an apertured masking disc mounted in said housing adjacent said lamp and said optical means for intercepting and dividing said beam into a first beam, a second beam and a third beam projected exteriorly of said housing, means defining a first aperture in said disc located along the optical axis of the projected beam, means defining a second aperture in said disc horizontally spaced from said axis and a third aperture in said disc vertically spaced from said axis, said first, second and third apertures respectively corresponding to said first, second and third beams; and a portable mirror stand having conjointly movable first, second and third reflecting surfaces, each surface being disposed for separately intercepting one of said beams projected along an initial path from said lamp housing, said reflecting means being movable to a position wherein said second and third beams are respectively deflected by said reflecting means along paths having the same planar relationship to the first beam as did their respective initial paths, said first beam being deflected by its associated reflecting surface along a vertical plane disposed at 90 degrees relative to its initial path.

3. An optical wheel aligning apparatus comprising a wheel mirror adapted to be mounted on the vehicle wheel to be checked, said mirror lying in a plane parallel to the general plane of the wheel and facing outwardly therefrom; a portable mirror stand placed adjacent the wheel and independently supported upon the floor, said mirror stand including three mirrors mounted therein for conjoint movement about a vertical axis, a horizontal axis normal to the general plane of the wheel and a horizontal axis parallel to the general plane of the wheel; means for projecting three beams of light alongside the vehicle and onto individual ones of said three mirrors, said light beams comprising a generally horizontal main beam, a first reference beam generally parallel to said main beam and vertically aligned therewith; a chart surrounding the projection source of said light beams and provided with a horizontal reference line and a vertical reference line intersecting at the optical axis of said projection source, and having adjacent indicia for indicating alignment characteristics of the wheels; said three reflecting mirrors being adapted to reflect the projected main beam 90 degrees toward said wheel mirror and to reflect the first and second projected reference beams 180 degrees back onto said chart; and plural adjustment means mounted in said mirror stand and adapted to be independently actuated for conjointly moving said three mirrors about said horizontal axes and about said vertical axis.

4. In an optical wheel aligning apparatus, the combination comprising a projector for emanating a light beam, masking means mounted on said projector in the path of said beam for delineating three separate beam portions in predetermined alignment relative to each other, said beam portions comprising a main part and two reference parts displaced at different locations from said main part, portable mirror support means independent of said projector and supporting a first plane mirror, means for positioning said mirror support means, means being capable of being located by movement thereof to cause said first mirror to reflect the projected main beam part along a path perpendicular to its initial path, and two auxiliary mirrors carried by said mirror support means at 45 degrees relative to said first mirror and so positioned so that each of said auxiliary mirrors intercepts a different one of said reference beam parts, said reference beam parts thus being reflected by said auxiliary mirrors along paths substantially 180 degrees from their initial paths when said first mirror reflects said projected beam along said perpendicular path.

5. In an optical wheel aligning apparatus, the combination comprising a projector for emanating a light beam having visually discernible separate first, second and third parts, portable mirror support means independent of said projector, a first plane mirror carried by said mirror support means and arranged to reflect said first part of the projected beam along a path perpendicular to the initially projected beam, and second and third plane mirrors carried by said mirror support means in predetermined orientation relative to said first mirror and so positioned when said first mirror is located to reflect said first part of said projected beam along said perpendicular path as to respectively intercept said second and third parts of said beam and to reflect said second and third parts of the projected beam toward said projector.

6. Apparatus according to claim 1 wherein said mirror stand is provided with a gauge member projecting from said stand and said gauge has a distal end adapted to be placed close to a vehicle wheel so as to position said stand in a desirable operating position.

References Cited by the Examiner

UNITED STATES PATENTS

| | | | |
|---|---|---|---|
| 2,308,139 | 1/1943 | Woodall | 88—74 |
| 2,500,051 | 3/1950 | Wolff | 88—24 |
| 2,667,805 | 2/1954 | Carr | 88—14 |
| 2,700,319 | 1/1955 | Carr | 88—14 |
| 2,724,987 | 11/1955 | Reason et al. | 88—24 |
| 2,907,246 | 10/1959 | Farrand et al. | 88—1 |

JEWELL H. PEDERSEN, *Primary Examiner.*

O. B. CHEW, *Assistant Examiner.*

UNITED STATES PATENT OFFICE
CERTIFICATE OF CORRECTION

Patent No. 3,288,020　　　　　　　　　　　　November 29, 1966

Melvin H. Lill

It is hereby certified that error appears in the above numbered patent requiring correction and that the said Letters Patent should read as corrected below.

Column 12, line 21, after "and" insert -- horizontally aligned therewith, and a second reference beam generally parallel to said main beam and --; line 44, for "means, means being capable" read -- means --; line 45, strike out "of being located by movement thereof".

Signed and sealed this 7th day of November 1967.

(SEAL)
Attest:

Edward M. Fletcher, Jr.　　　　　　　　　　　EDWARD J. BRENNER
Attesting Officer　　　　　　　　　　　　　　Commissioner of Patents